March 17, 1970  W. H. SCHÜTT  3,500,986
LOADING DEVICE FOR MACHINE TOOLS
Filed July 11, 1968 2 Sheets-Sheet 1
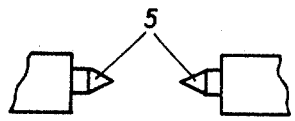
*Fig.1*
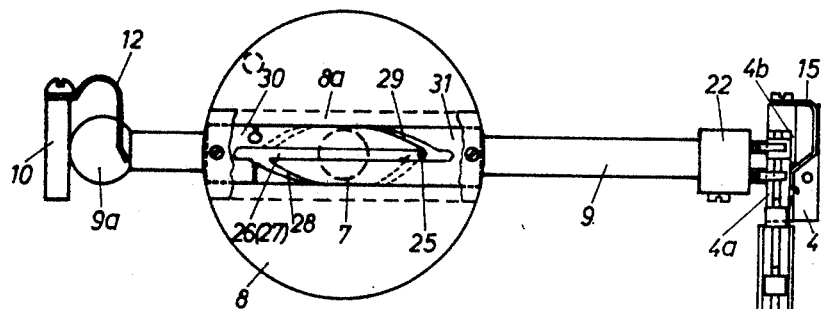
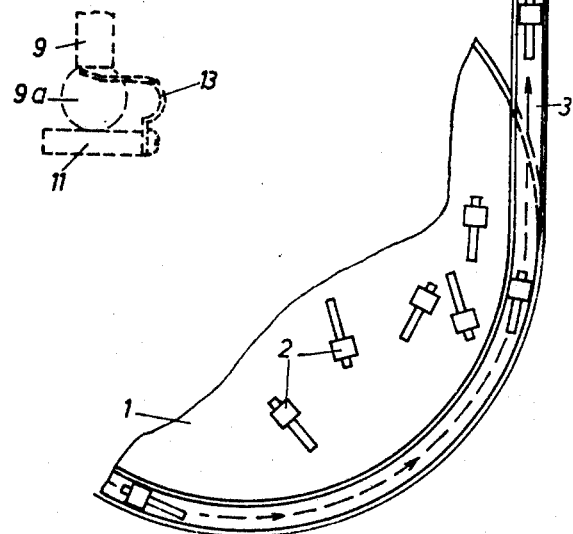
INVENTOR
Wilhelm H. Schütt
BY
March, Gillette & Wyatt
ATTORNEYS March 17, 1970 W. H. SCHÜTT 3,500,986
LOADING DEVICE FOR MACHINE TOOLS
Filed July 11, 1968 2 Sheets-Sheet 2
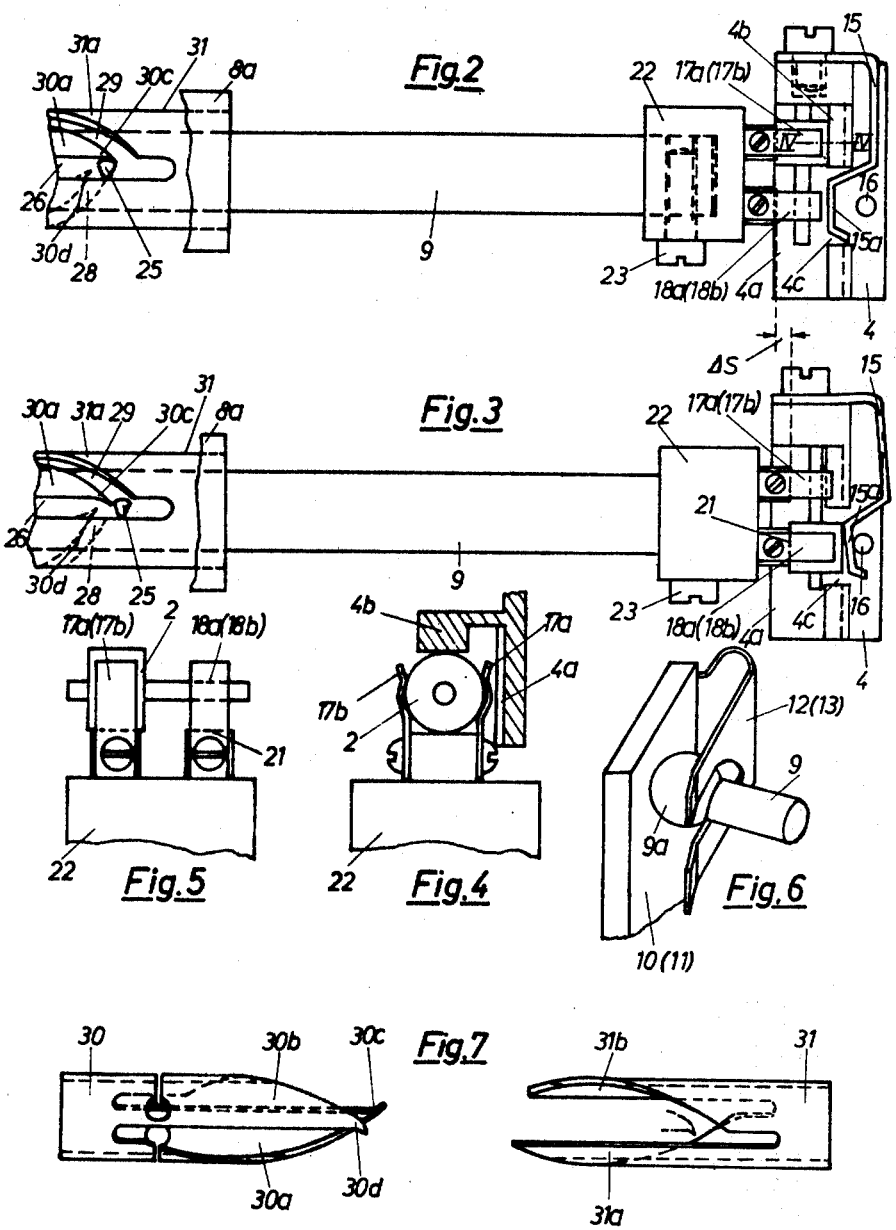
INVENTOR
Wilhelm H. Schütt
BY
March, Gillette & Wyatt
ATTORNEYS United States Patent Office 3,500,986
Patented Mar. 17, 1970

3,500,986
LOADING DEVICE FOR MACHINE TOOLS
Wilhelm H. Schütt, Calmbach, Black Forest, Germany, assignor to Prontor-Werk Alfred Gauthier, G.m.b.H., Calmbach, Black Forest, Germany, a corporation of Germany
Filed July 11, 1968, Ser. No. 744,058
Claims priority, application Germany, July 13, 1967, P 42,588
Int. Cl. B65g 47/24
U.S. Cl. 198—33     14 Claims

ABSTRACT OF THE DISCLOSURE

This invention discloses a loading device for machine tools which includes a rotary bearing body and a bar axially guided in the bearing body. The bar is provided at one end with a gripping mechanism to remove individual roughed work-pieces from a loading station. The roughed workpieces have any desired cross section profile with at least on extension with a reduced cross section extending in a longitudinal direction. The workpieces are charged by means of a vibration conveyer over a feed trough in a continuous flow to the loading station and fed by the bar and gripping mechanism to the work receiver of the machine tool. The loading station has a wall with an opening, the wall being subjected to a working load during the engagement of the workpiece by the gripping mechanism and the opening being shaped to the profile of the workpiece to permit a yielding movement of the workpiece by a distance Delta S in a certain relative position so that when the normal movement of the gripping mechanism is exceeded by the distance Delta S, a turning mechanism provided in the bearing body becomes effective to set the gripping bar into a rotary movement of 180 degrees to properly position the workpiece for reception by the work receiver of the machine tool.

---

The invention concerns a loading device for machine tools consisting of a rotatable bearing body and of a bar guided therein for axial displacement. The bar is provided at one end with a gripping mechanism by means of which workpieces with any cross sectional profile having at least one extension in the longitudinal direction with a reduced cross section can be removed individually from a loading station, charged in a continuous flow by means of a vibration conveyor or a feed trough and fed to the work receiver of the machine tool.

A prerequisite in a loading device of the above described type was heretofore that the workpieces to be conveyed must be subjected before leaving the vibration conveyor to a correct position sorting, whereby only those workpieces which assume a definite position with respect to the direction of conveyance can leave the vibration conveyor and be conveyed by means of the feed trough. A disadvantage of these loading devices is that some workpieces, particularly small ones or those with a relatively complicated form, are excluded from the automatic feed, because a satisfactory alignment of the parts in the conveyor could simply not be achieved or the means necessary for the alignment and sorting required unproportionally high constructional expenditures. Another disadvantage is that a special shaking pot with sorting baffle plates is required for workpieces of different forms.

It is an object of this invention to eliminate these inconveniences. It has now been found that the foregoing and related objects can be readily attained in a loading device for machine tools comprising a loading station provided with a wall which is subjected to a work load by the gripping mechanism when receiving the workpiece. The loading station wall has an opening adapted to the profile of the workpiece and permits in a certain relative position a yielding movement of the workpiece by a distance Delta S. When the normal gripper movement is exceeded by the distance Delta S, a turning mechanism dependent on its axial displacement becomes operative in the bearing body and causes the gripping bar to rotate 180 degrees. In this way the alignment no longer has to be effected directly as heretofore in the vibration conveyor, which permits the use of the same shaking pot for different workpieces, since the installation of a specific sorting baffle plate, cut exactly to the profile of the workpiece is no longer necessary. However, it can only be used for workpieces which can be considered as similar with respect to their form or at least in agreement in their relative dimensions.

In order to ensure a trouble-free operation of the apparatus, that is, to avoid positively any striking of the workpieces against edges, corners, etc. when entering the loading station, this invention provides in the range of the opening of the loading station an elastically yielding resilient guide surface. Preferably a congruously shaped leaf spring, secured on the loading station itself, can be used as a guide surface which is simple to produce and easy to install. Instead of a leaf spring, a pressure plate yieldingly mounted against the action of a spring could be used.

In order to achieve the most universal use of the loading device according to the invention, the loading station provided at the end of the feed trough may be exchangeable. This way, when changing to a different workpiece, it is merely necessary to remove the loading station corresponding to the previously used workpiece and to replace it by another loading station adapted to the workpiece to be machined, while the vibration-conveyor, feed trough, etc. can be retained if necessary.

A simple design of the turning mechanism, utilizing the movements of the gripping mechanism, can be achieved by providing a guide groove in the bearing body and a pin on the circumference of the gripping bar engaging this groove to achieve the rotary movement of the gripping bar. This arrangement can also be considered advantageous insofar as it does not require significant additional installation space. An easy-to-manufacture embodiment of the turning mechanism has a guide groove which is formed of two coaxially extending oppositely positioned longitudinal slots which are connected to each other by two helical transverse slots which extend from one end of one slot to the other end of the other slot. Preferably, for forming the guide slot, two complementary inserts each made of a cylinder shell can be used. The inserts are received by a cylindrical bore of the bearing body and are rigidly connected with the latter as a unit. The use of such inserts has the advantage that a maximum of precision is ensured in the end product with a relatively simple manufacturing method.

An embodiment of a gripping device, which is simple to manufacture, reliable in operation, and which grips the workpieces gently can be achieved by the use of two clamping springs of identical form provided side by side on the end face of the gripping bar. In order to limit the exchange of the parts of the loading device to an absolute minimum when changing to a different workpiece, the invention provides furthermore that the clamping springs may be arranged on the end face of a retaining bush exchangeably mounted on the gripping bar.

Other objects and advantages will be readily apparent from the following detailed specification and claims and the drawings of an embodiment of the invention wherein:

FIGURE 1 is a top view of a loading device for the mechanical feeding of workpieces illustrating a gripping bar mounted for axial displacement and rotation in the position assumed for gripping a workpiece and ilustrating in the gripping bar broken lines in a position which it assumes briefly before the workpiece is received and delivered to the machine tool.

FIGURE 2 is a partial top view on an enlarged scale of the gripping bar and its turning mechanism when gripping a workpiece that has arrived in the loading station in the correct position.

FIGURE 3 is a view similar to FIGURE 2 illustrating the gripping bar when gripping a workpiece that did not arrive in corect position wherein the bar covers an additional distance Delta S.

FIGURE 4 is a partial cross sectional view through the loading station with the gripping mechanism entered in said station.

FIGURE 5 is a partial top view of the gripping mechanism with a workpiece.

FIGURE 6 is a fragmentary perspective view of the end of an operating lever in engagement with the gripping bar for moving the latter.

FIGURE 7 is an exploded view of two complementary inserts provided to form a guide groove.

Referring now to the drawings, a vibration conveyor, generally designated by reference numeral 1, is adapted to be positioned in the range of a machine tool and is a part of a device for the automatic feeding of workpieces 2 to the machine tool. The workpieces 2 leave the shaking pot of the vibrator in a continuous flow and arrive over a feed trough 3 at a loading station 4 provided with a bottom 4a and a one side wall 4b, where the workpieces 2 are engaged individually by a loading device to be described more fully below and are fed to the work receiver of the machine tool, indicated by the two receiving tips 5, set in a predetermined position.

As it can be seen from FIGURE 1, the loading device comprises a bearing body 8 fixedly mounted on a shaft 7 and adapted to receive an axially displaceable gripping bar 9. For the axial displacement of the gripping bar 9, two pivotally mounted operating levers 10 and 11 are povided which are spaced geometrically from each other. Each of the levers 10 and 11 carries, as illustrated in FIGURES 1 and 6, a fork-shaped, elastically yielding gripping piece 12 and 13 respectively with which one end of the gripping bar, provided preferably with a spherical head 9a, can be brought in engagement. The operating lever 10 is provided to move the gripping bar 9 in the direction of the loading station 4 and away from the latter after it has engaged a workpiece. The operating lever 11 has the function of moving the gripping bar 9, after the later has been swung into a position indicated in FIGURE 1 by broken lines, which is suitable for the transfer of the workpiece to the machine tool, toward the work receiver 5 and to retract it again. The drive of the operating levers 10 and 11, and the drive for the rotary shaft 7 for moving the bearing body 8 in an angular range of 90 degrees in the embodiment according to FIGURE 1, can be derived from the control shaft of the machine tool.

If it is desired to use a vibration conveyor more universally for economical balancing, that is to convey different workpieces of similar form with one and the same shaking pot, there will be a requirement for the elimination of the sorting baffle plates generally used for separating the inverted workpiece from the conveyor current. This in turn means, however, that workpieces can leave the shaking pot of the vibrator both in correct and in an inverted position and arrive over the feed trough 3 in the loading station 4. Here they are received by the gripping mechanism and fed by means of the latter to the work receiver of the machine tool. However, when the workpiece has not arrived in the loading station in correct position, there must be a position correction of the workpiece by a turning on its way to the work receiver.

The turning of the workpiece is effected by means of a mechanism acting on the gripping bar 9, whose control is effected in dependence on the position of the workpiece in the loading station. Preferably a wall 4b of the loading station 4, which is subjected to a certain working load when a workpiece 2 is engaged by the gripping bar 9, is provided to this end with an opening 4c adapted to the profile of the workpiece. The arrangement can be such that, when a workpiece 2 enters in the correct position, it bears with its part having the larger diameter on side wall 4b, as it can be seen from FIGURE 2. But if the workpiece arrives in the loading station in inverted position, as illustrated in FIGURE 3, the part of the workpiece having the larger diameter will be in front of the opening 4c with regard to the direction of conveyance. If the gripping mechanism strikes a workpiece that assumes this position, the latter yields by a small amount Delta S until the lug of the workpiece 2 with the reduced cross section bears on the side wall 4b with the result that the turning mechanism goes into action on the return path of the gripping bar 9. To make sure that those workpieces 2 which arrive in the loading station in the correct position can pass unhindered along the opening 4c, a guide-surface formed of a leaf spring 15 is provided in its range. The leaf spring 15 can have the form illustrated in FIGURES 2 and 3, and be provided with an offset part 15a to form a guide surface. In order to limit the yielding movement, a stop pin 16 is provided on the loading station 4, on which the offset part 15a of the leaf spring 15 finally comes to bear when the workpiece 2 in the loading station, as represented in FIGURE 3, is displaced by the distance Delta S during the engagement.

For the engagement of the workpiece, the gripping bar 9 is provided with a gripping mechanism which is formed of two juxtaposed clamping springs 17a and 17b and 18a and 18b respectively as can be seen particularly from FIGURES 4 and 5, which are arranged on a retaining bush 22 detachably mounted on the gripping bar 9. The retaining bush 22 is so secured by means of a screw 23 on the gripping bar 9 that it can be readily exchanged, if necessary, as can be the loading station 4.

As pointed out above, the workpieces 2 are brought into the correct position, if necessary, by means of gripping bar 9. To this end a turning mechanism is associated with the bar 9 which becomes operative when the normal gripping movement is exceeded by the distance Delta S and which turns the gripping bar 9 upon its subsequent return by 180 degrees. The turning mechanism comprises, in the represented embodiment, a guide groove which is provided in a guide sleeve 8a forming a fixed part of the bearing body 8 for receiving the gripping bar 9. In addition, a guide pin 25 is secured on the gripping bar 9, which engages the guide groove. The guide groove itself can be formed of two coaxially extended opposite slots 26 and 27 and two helical transverse slots 28 and 29, staggered by 180 degrees. The arrangement can also be such that the transverse slot 29 connects one end of the coaxial slot 26 with the other opposite end of the opposite coaxial slot 27. In a similar manner the helical transverse slot 28 is designed to be staggered by 180 degrees. The slots 26 to 29 advantageously can be formed of two complementary inserts 30 and 31, each made of a cylindrical shell.

As it can be seen from FIGURE 7, the two inserts 30 and 31 each have two fingers 30a and 30b and 31a and 31b respectively which engage each other in the assembled state, forming the slots 26 to 29. The fingers 30a and 30b terminate each in a reversing nose 30c and 30d respectively, of which the former protrudes into the coaxial slot 26 and the latter into the opposite slot 27. FIGURE 7 also shows that the finger 30b is somewhat shorter than finger 30a. In addition, the fingers 30a and 30b are elastic or resilient while the fingers 31a and 31b of insert 31 can be rigid. The gripping bar 9 is guided displaceably in the inserts 30 and 31, which in turn are secured by means of screws in the guide sleeve 8a.

The method of operation of the above described arrangement is as follows:

The axial movements of the gripping bar 9 and the turning of the shaft 7 are tuned to the movements of the machine tool in such a way that during the machining of one workpiece, the gripping bar 9 is in engagement with the operating lever 10 and moved by the latter into the loading station 4. If a workpiece 2 in the loading station 4 has arrived in correct position, the advance movement of the gripping bar 9 is limited by its striking the workpiece 2 which bears on the side wall 4b of the loading station 4. During the advance movement, the guide pin 25 slides in the slot 26 and assumes at the end of the gripping movement the position indicated in FIGURE 2 with respect to the reversing nose 30c. When the machining tool is disengaged after the machining process, the gripping bar 9 returns, and retains its angular position unchanged. After the lever 10 reaches its end position, the gripping bar 9 is brought in engagement with the operating lever 11 by turning the shaft 7 counter-clockwise, as indicated in FIGURE 1 by broken lines. The operating lever 11 again imparts to the gripping bar 9 an advance movement and the workpiece 2 held in the gripping mechanism is moved into the range of work receiver 5 and engaged by the latter. When the machining tool is moved into operating position, the gripping bar 9 again is retracted by means of the lever 11 and subsequently brought in engagement with the operating lever 10 by turning the shaft 7 clockwise. During the subsequent machining operation the operating lever 10 again moves the gripping bar 9 into the loading station 4.

If the loading station 4 contains a workpiece that has not arrived in the correct position, the gripping bar 9 must perform a greater stroke, increased by the distance Delta S, in order to engage the workpiece, as illustrated in FIGURE 3, because part of the workpiece 2 having the larger diameter is first pushed through the opening 4c by the lug 21 of the gripping mechanism. The guide surface 15a provided on the leaf spring 15 yields until it bears on the stop pin 16. The workpiece is now held by clamping springs 18a and 18b. When passing over the additional distance Delta S, the guide pin 25 slides past the reversing nose 30c, pushing the latter aside, and assumes finally the position shown in FIGURE 3. During the subsequent return of the gripping bar 9, the guide pin 25 is pushed by the reversing nose 30c into the transverse slot 29, so that the gripping bar 9 performs a rotation of 180 degrees in the further course of its return movement, and the workpiece 2 held in the gripping mechanism is turned at the same time. At the end of the return path, the guide pin 25 engages the slot 27 opposite the slot 26. During the advance movement of the gripping bar 9 following the rotation of the shaft 7, the guide pin 25 now slides in the coaxial slot 27. Toward the end of the advance movement of the gripping bar 9 effected by the operating lever 11, the guide pin 25 passes the reversing nose 30d. During the return movement of the gripping bar 9 following the transfer of the workpiece, the guide pin 25 is pushed away by the reversing nose 30d into the transverse slot 28, which in turn results during the further course of the return movement in a rotation of the gripping bar by 180 degrees. At the end of the cycle, the gripping bar again assumes its original position. The turning mechanism, therefore, only effects a rotation of the gripping bar 9 in a movement increased by the distance Delta S, while this rotation does not take place in a normal gripping stroke.

The invention is not limited to the embodiment represented and described above, but comprises additional possibilities of realization. Thus, the arrangement could be such, for example, that the gripping bar 9 is only turned once by 180 degrees in the loading station during a working cycle after engaging a workpiece that has not arrived in correct position. In order to achieve this, a stationary adjustable stop could be associated with the gripping bar 9, which limits the advance movement during the feeding of the workpiece to work receiver 5 for the normal stroke, a path without Delta S. During the return movement of the gripping bar 9 following the transfer of the workpiece to the machine, the guide pin 25 would then slide back in the axial slot 27. The fingers 30a and 30b would have to be made equally long for this embodiment of the invention.

It will be understood that the foregoing description with the details of exemplary structure is not to be construed in any way to limit the invention, but that modifications may be made thereto without departing from the scope of the invention.

What is claimed is:

1. A loading device for machine tools including a rotary bearing body, a bar guided for axial movement in said bearing body, said bar being provided at one end with a gripping mechanism to remove individual roughed workpieces from a loading station, said roughed workpieces having any desired cross sectional profile with at least one extension with a reduced cross section extending in a longitudinal direction, said workpieces being charged by means of a vibration conveyor over a feed trough in a continuous flow to said loading station and fed by said bar and gripping mechanism to the work receiver of the machine tool, said loading station having a wall with an opening, said opening being similar in shape to the profile of said workpiece, said wall being subjected to a working load during the engagement of said workpiece by the gripping mechanism and having means to permit a yielding movement of the workpiece by a distance Delta S in a certain relative position, so that when the normal movement of said gripping mechanism is exceeded by the distance Delta S, a turning mechanism provided in said bearing body becomes effective upon retraction of the bar to set said gripping bar into a rotary movement of 180 degrees to properly position the workpiece for reception by the work receiver of the machine tool.

2. The loading device of claim 1 wherein the means to permit a yielding movement comprises an elastically yielding guide surface disposed in said opening of said loading station.

3. The loading station of claim 2 wherein said guide surface is a congruously shaped leaf spring secured on said loading station.

4. The loading device of claim 3 wherein said loading station provided at the end of said feed trough is exchangeably mounted.

5. The loading device of claim 1 wherein the turning mechanism comprises a guide groove provided in said bearing body with a pin on the circuference of said gripping bar engaging said groove in order to achieve the rotary movement of said gripping bar.

6. The loading device of claim 5 wherein said groove is formed by two coaxially extending oppositely positioned longitudinal slots which are connected with each other by two helical transverse slots which extend from one end of one slot to the other end of the other slot.

7. The loading device of claim 6 wherein said guide groove is formed by two complementary inserts each made of a cylindrical shell, said inserts being received by a cylindrical bore of said bearing body and rigidly connected thereto as a unit.

8. The loading device of claim 5 wherein said gripping mechanism includes two clamping springs of equal form which are disposed side by side on the end face of said gripping bar.

9. The loading device of claim 8 wherein said clamping springs are arranged on the end face of a retaining bush exchangeably mounted on said gripping bar.

10. A loading device for machine tools including a rotary bearing means, a bar guided for axial movement in said bearing means, said bar being provided at one end with gripping means to remove individual roughed workpieces from a loading station, said roughed workeces having a cross sectional profile with at least one tension with a reduced cross section extending in a longitudinal direction, said loading station having a wall with an opening, said wall being subjected to a working load during the engagement of the workpiece by said gripping means, said opening being similar in shape to the profile of said workpiece, a resilient guide surface mounted on said loading station and disposed in said opening and arranged to permit a yielding movement of said workpiece against said guide surface by a distance Delta S when said workpiece is in a certain relative position so that when the normal gripping means movement is exceeded by the distance Delta S, turning means in said bearing body becomes effective upon retraction of the bar to rotate said gripping bar 180 degrees.

11. The loading device of claim 10 wherein said guide surface is a congruously shaped leaf spring secured on said loading station.

12. The loading device of claim 11 wherein said turning means includes a guide groove provided in said bearing body and a pin on the circumference of the gripping bar engaging said groove in order to achieve the rotary movement of the gripping bar.

13. The loading device of claim 12 wherein said guide groove is formed by two coaxially extending oppositely positioned longitudinal slots which are connected with each other by two helical transverse slots which extend from one end of one slot to the other end of the other slot.

14. The loading device of claim 13 wherein said guide groove is formed by two inserts made of a cylindrical shell, said inserts being received by a cylindrical bore of said bearing means and rigidly connected therewith as a unit.

References Cited

UNITED STATES PATENTS 3,034,633  5/1962  Clifford _____ 198—33
3,081,885  3/1963  Carlze _____ 214—1

GERALD M. FORLENZA, Primary Examiner

G. F. ABRAHAM, Assistant Examiner

U.S. Cl. X.R.

214—1